United States Patent [19]

Myers

[11] Patent Number: 4,739,616
[45] Date of Patent: Apr. 26, 1988

[54] SUMMING PRESSURE COMPENSATION CONTROL

[75] Inventor: H. Allen Myers, Ames, Iowa

[73] Assignee: Sundstrand Corporation, Rockford, Ill.

[21] Appl. No.: 808,592

[22] Filed: Dec. 13, 1985

[51] Int. Cl.$^4$ .................................................. F15B 11/16
[52] U.S. Cl. ........................................ 60/420; 60/428; 60/445
[58] Field of Search .................. 60/428, 445, 447, 487, 60/488

[56] References Cited

U.S. PATENT DOCUMENTS

| | | |
|---|---|---|
| 3,732,036 | 5/1973 | Busbey et al. . |
| 3,795,107 | 3/1974 | Ward . |
| 3,859,790 | 1/1975 | Bacquie ........................... 60/428 X |
| 3,914,938 | 10/1975 | Cornell et al. . |
| 3,941,514 | 3/1976 | Louis et al. . |
| 3,948,049 | 4/1976 | Ohms ............................... 60/428 X |
| 3,999,387 | 12/1976 | Knopf . |
| 4,011,920 | 3/1977 | Bianchetta et al. . |
| 4,017,218 | 4/1977 | Burk ................................. 60/428 X |
| 4,023,637 | 5/1977 | Jackovich . |
| 4,024,710 | 5/1977 | Zelle ................................ 60/428 X |
| 4,040,254 | 8/1977 | Knapp et al. . |
| 4,055,046 | 10/1977 | Schexnayder .................... 60/428 |
| 4,065,228 | 12/1977 | McMillan ......................... 60/428 X |
| 4,103,489 | 8/1978 | Fletcher et al. . |
| 4,116,002 | 9/1978 | Knapp ............................... 60/488 X |
| 4,189,920 | 2/1980 | Dezelan . |
| 4,191,017 | 3/1980 | Dezelan . |
| 4,195,479 | 4/1980 | Dezelan . |
| 4,211,079 | 7/1980 | Saele ................................ 60/487 X |
| 4,354,420 | 10/1982 | Bianchetta . |
| 4,364,230 | 12/1982 | Holmes . |
| 4,379,389 | 4/1983 | Liesenen ............................ 60/428 |
| 4,382,485 | 5/1983 | Kirkham ........................... 60/428 X |
| 4,395,878 | 8/1983 | Morita et al. . |
| 4,399,886 | 8/1983 | Pollman . |
| 4,405,287 | 9/1983 | Kuchenbecker ................. 60/447 X |
| 4,474,104 | 10/1984 | Creffield . |
| 4,531,366 | 7/1985 | Moriya ............................. 60/428 X |
| 4,559,778 | 12/1985 | Kruscke .......................... 60/447 |

Primary Examiner—Gerald A. Michalsky
Attorney, Agent, or Firm—James A. Wanner; Trevor B. Joike; Harold A. Williamson

[57] ABSTRACT

A displacement control for a variable displacement hydraulic motor wherein the control is a summing pressure compensator control which is responsive to the pressures of a plurality of loads so that the average, weighted average, or total pressures of the loads can be sensed to generate a control signal for increasing the displacement of at least one motor when the plurality of pressures have a sum or average above a predetermined level. The summing pressure compensator control can also include an overpressure sensing device which is responsive to the pressure of one load, or the highest pressure of more than one load, to also provide a control signal to increase motor displacement. The increase in motor displacement limits the pressure of the motor system.

29 Claims, 3 Drawing Sheets

SUMMING PRESSURE COMPENSATION CONTROL

FIELD OF THE INVENTION

The present invention relates to the control of variable displacement motors wherein the controls are of the pressure compensator type. Thus main system pressures, representative of total load, are sensed to increase the displacement of the motor, which results in reduction in motor speed to compensate for overload conditions. The present invention is directed to summing various pressure inputs and is particularly beneficial in dual path hydrostatic transmission propel systems. The preferred summing system compensates for the total drive as a result of the average pressure of both transmissions and also limits the maximum pressure in either of the transmissions. The summing pressure compensation system can also take into account other hydraulic loads such as vehicle accessories.

BACKGROUND OF THE INVENTION

Single pressure compensation systems for variable displacement motors are known wherein the system pressure, representative of torque load on the motor, is used to modulate the displacement of the hydraulic motor in a manner to reduce speed, and thus overload, upon an increase in sensed pressure. A motor pressure compensator allows the motor to remain at minimum displacement, and thus maximum speed, until the output load on the motor shaft increases to the level which raises system pressure to the pressure compensator setting. As the output load is further increased, the motor displacement is increased, allowing motor load torque to be supplied at a lower rpm with little or no increase in system pressure. Likewise, as the output load and system pressure are decreased, the pressure compensator causes the motor displacement to be decreased allowing the load torque to be supplied at a higher rpm. In normal operation, the pressure compensator always tries to cause the motor to operate at the compensator setting and thus at the highest speed without the pressure exceeding a preset limit. It is desirable to set the compensator at an intermediate pressure level to prolong transmission life. Thus, for a hydrostatic transmission system having a 6,000 psi maximum intermittent pressure, limited by pressure relief valves, it is usually desirable to set the motor compensator at about 3,500 psi. However, since pressures above 3,500 psi cause the motor displacement to increase, a pressure compensator system prevents getting maximum utilization of the motor even for intermittent use, that is maximum speed at maximum pressure.

In some vehicles, particularly dual track vehicles, it is common to have a dual drive hydrostatic propel system with each drive having its own independent hydrostatic transmission. If the control is of the motor pressure compensator type, each motor is subject to its own independent pressure compensator usually set at some intermediate pressure level as indicated above. In some applications, such as a snow groomer application, this intermediate pressure compensator setting causes problems during downhill operations. When the snow groomer travels downhill at high speeds and begins to slide out of control due to a lack of traction, particularly under one of the tracks, it may be necessary to operate the opposite track at full speed with high tractive effort, which requires maximum system pressure, in order to regain vehicle steering control. If the pressure compensators of the transmission motors are set at an intermediate pressure setting, such as 3500 psi, the increased tractive effort needed may be sufficient to cause the pressure compensator to operate which increases motor displacement and reduces motor speed. This reduces the capability of the high tractive effort track to reach sufficient speed to catch up with the sliding track in a manner which provides steering stability. This tractive effort and speed limitation of the driving track can be substantially eliminated by increasing the intermittent pressure compensator setting to 5000 psi, but such a high pressure setting is undesirable for continuous uphill operation since continuous motor operation at this higher pressure setting significantly reduces motor life and can cause excessive loading on the vehicle engine. The present invention is directed to providing a control system which solves the dilemma on how to meet both requirements. The snow groomer application is only one of many applications where the present invention can be used in an advantageous manner.

SUMMARY OF THE INVENTION

The motor pressure compensator control of the present invention will compensate or increase motor displacements when there is more than one load, and wherein the sum of the loads for control purposes exceeds a predetermined level. This is obtained by using a summing control which senses the pressure of the motor and the other loads to determine an average pressure and limiting the average pressure to a first predetermined level by establishing a motor compensator control signal. This is referred to herein as a summing pressure compensator control. The summing pressure compensator control limits the total load on a prime mover from both the variable displacement motor transmission and other loads, such as implement loads, by increasing motor displacement when the weighted average of the sensed loads reaches the predetermined pressure level. By using pressure averaging, the summing compensator can be set to start increasing motor displacement at an intermediate pressure level when the load pressures, or weighted load pressures, are nearly equal. This increases the life of the motor and other components. However, when the other loads are at lower demands, the motor pressure can exceed the set average pressure for intermittent operation and thus maximum use of the motor is obtained.

The summing pressure compensator control can also be combined with a motor overpressure compensator control which is responsive to the motor pressure and operates at a second higher predetermined pressure level to limit the maximum pressure at the motor, regardless of the average pressure of the motor and other loads.

The summing pressure compensator control is particularly desirable when utilized on dual propel systems, such as a dual track vehicle having a pair of identical hydrostatic transmissions on the right and left sides thereof, wherein the summing pressure compensator control senses the average pressure of the right and left transmissions to generate a compensating control signal when the average pressure exceeds a predetermined intermediate pressure, such as 3500 psi. Thus, when both propel transmissions are equally loaded, both motors can be limited to a continuous 3500 psi maximum pressure to increase transmission life. When one of the motors, due to a loss of tractive effort as in slipping or during a turn, is loaded at a pressure below the predetermined average pressure, the other motor can be driven at a higher pressure until the sum of the two transmission pressures equals twice the predetermined average pressure setting. This is particularly beneficial in the snow groomer application mentioned above wherein the slipping track requires little tractive effort and the opposite track is driven at higher tractive effort to catch up to that side of the vehicle with the slipping side of the vehicle.

When the overpressure compensator control is used in addition to the summing pressure compensator control in a dual propel system, not only is the average pressure maintained under equal, and near equal, load conditions, but the maximum pressure of each transmission can be limited when the opposite transmission is driven at low pressure levels. For example, each transmission can be limited to a maximum 5000 psi pressure by the overpressure compensating control even though the summing pressure compensator control might permit one transmission to operate at higher pressure levels when the other transmission is unloaded or lightly loaded.

When the summing pressure compensator control is utilized on a vehicle having auxiliary loads such as hydraulically driven implements, the implement pressures can be summed with the average propel transmission pressure to provide a summing pressure compensating signal which is the weighted average of the average propel transmission pressure and the implement pressure. This can be utilized to increase both motor displacements to reduce the overall load on the vehicle engine.

Thus the primary object of the present invention is to provide a summing pressure compensator for controlling a variable displacement motor or motors and which utilizes the average, or weighted average, of pressures applied to various loads to increase the motor displacement. When the summing pressure compensator control is utilized in dual propel systems the average pressure of the two transmission systems is sensed by the summing pressure compensator control to limit the sum of the two transmission pressures while permitted one transmission to operate at a higher pressure than the predetermined average pressure. Such pressure compensator control can be utilized with a single motor and other loads or with plural motors, with or without other loads, to provide a motor displacement control pressure when the weighted average of the various load pressures rises above a predetermined pressure level.

Another object of the present invention is to provide the summing pressure compensator controls defined above with an overpressure compensating control which is simply integrated with the summing pressure compensator control circuit and thus utilizing various elements thereof. This overpressure compensation control limits the maximum pressure applied to the variable displacement motor or motors, even if such higher pressure level were permitted by the summing pressure compensator control.

It is a further object of the present invention to provide a summing pressure compensator control which, in the preferred form, is totally hydraulic in operation and utilizes a series of orifices of progressively reducing size in combination with one or more summing junctions to establish control pressures representing the average, or weighted average, applied to the summing junction or junctions.

It is a further object of the present invention to provide a summing pressure compensator control for a plurality of hydraulic loads, with at least one of said hydraulic loads being a servo controlled variable displacement motor. First and second hydraulic means are responsive to the supply of fluid to the variable displacement motor and another load to provide first and second pressure signals. A summing means receives the first and second pressure signals to provide a control signal proportional to the sum of said first and second pressure signals which is applied to the motor servo to increase the displacement of the variable displacement motor.

It is another object of the present invention to provide a summing pressure compensator control for a pair of servo controlled variable displacement motors. First and second hydraulic means responsive to the supply of fluid to the motors provides first and second pressure signals, which are received by summing means to provide a third pressure signal equal to the average of said first and second pressure signals. Pressure responsive means are responsive to the third pressure signal to provide a compensating control signal when the third pressure signal is above a predetermined pressure. The compensating control signal is applied to the servo means to increase the displacement of the variable displacement motors. An overpressure compensator can provide a fourth signal, equal to the higher of the first and second signal, to the pressure responsive means to also provide a compensating control signal when the higher of the first and second signals reaches a maximum desired pressure.

THE DRAWINGS

FIG. 1 is a schematic view of the summing pressure compensator control of the present invention.

FIG. 2 is a schematic diagram of a modified summing pressure compensator control utilized in a hydraulic system having plural variable displacement motors.

DESCRIPTION OF THE PREFERRED EMBODIMENTS

Figures 1, 2:
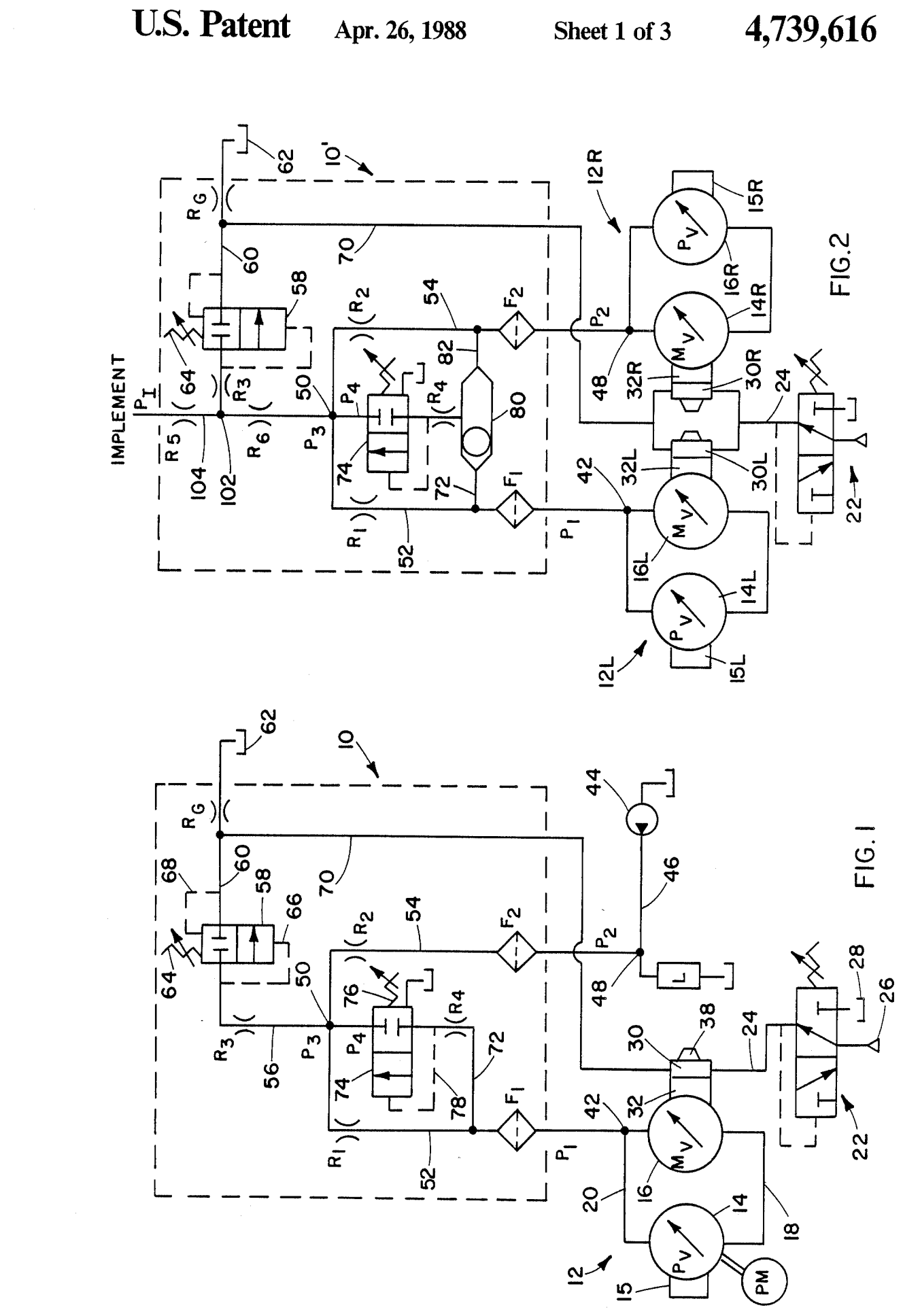
Figure 3:
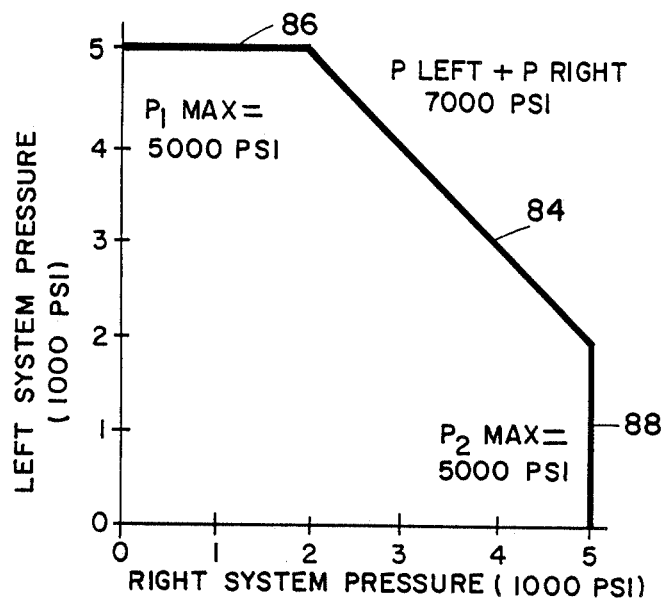
FIG. 3 is a graph showing the maximum pressures applied to a pair of transmissions utilizing a control, such as taught in FIG. 2.

FIG. 1 is a schematic view of one form of the summing pressure compensator control 10 of the present invention. The control 10 is utilized to determine the average pressure of two loads to provide a control output which limits the pressure requirements of one load when the average, and thus the sum, of the two pressures is increased to a first predetermined value. A first load is represented by hydrostatic transmission 12 consisting of a pump 14 driving a variable displacement motor 16. The pump 14 and motor 16 are shown in closed loop communication by a pair of fluid lines 18 and 20. As diagramatically shown, the pump 14 may be a variable displacement pump having its separate control 15 as is well known in variable displacement hydrostatic transmissions. However, the pump 14 can be a fixed displacement pump also in either closed loop communication or open loop communication with the motor 16, and the latter case only requiring a single line 20. It is also to be understood that the particular construction of the variable displacement hydraulic units, such as the motor 16, is not material relative to the practice of the summing pressure compensator control of the present invention. The horsepower input required by a variable displacement motor is proportional to its input pressure, that is the pressure between the pump 14 and the motor 16, times the flow supplied to the motor. Assuming that the flow driving the motor remains relatively constant, it can be easily recognized that the motor horsepower load is maintained constant if the displacement of the motor is increased as motor torque load is increased, to maintain input pressure constant.

Figure 5:
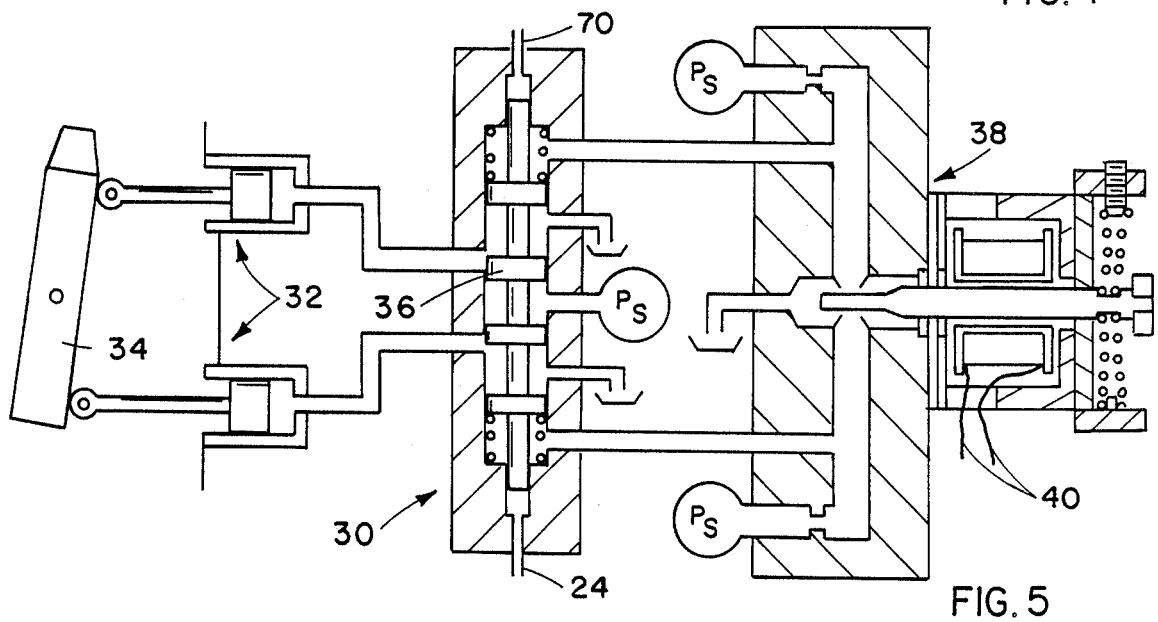
FIG. 5 is a part sectional view of some of the control elements that may be used to modify motor displacement in a control system such as taught in FIGS. 1 and 2.

The variable displacement motor 16 can have a primary displacement control input of various types, although the one shown in FIG. 1 utilizes a simple pressure reducing valve 22 providing a fixed pressure in line 24 by selectively modulating communication of line 24 with a source of fluid pressure 26 or a drain 28. The valve 22 could also be a more complicated hydraulic control providing variable pressure levels. As seen in FIG. 5, the line 24 is in fluid communication with a displacement control valve 30 which selectively connects a servo mechanism 32, positioning a swashplate 34 of the motor 16, to either a pressure source $P_s$ or drain. A control pressure in line 24 causes upward movement of the valve spool 36 of the displacement control valve 30 in a manner which operates the servo 32 in a counterclockwise direction as seen in FIG. 5 to reduce motor displacement to tend to operate the motor in its maximum speed or minimum displacement position.

An alternative form of control is electrohydraulic displacement control utilizing an electrohydraulic transducer pilot stage 38 receiving an electrical primary input signal through lines 40. The pilot stage 38 modulates the position of the spool 36 of the displacement control valve 30 to selectively position the motor swashplate 34 in a manner responsive to the electric primary input signal. When the electrohydraulic displacement control is utilized, the valve 22 and input line 24 to the displacement control valve 30 would not be utilized.

The above descriptions of the primary control of the variable displacement motor 16 represent but two well known displacement control systems utilized for varying the displacement of hydraulic units and are merely representative of normal controls for variable displacement motors which operate at maximum speed when in the minimum displacement position and at minimum speed when in the maximum displacement position.

The pressure driving the motor 16 is detected by first hydraulic means which merely consist of a tap 42 in forward main loop line 20 to provide a first pressure signal $P_1$ responsive to, and representative of, the pressure of the fluid supply to the motor 16. The overall system also includes at least one other load which can be either another variable displacement motor in a second hydrostatic transmission as described below relative to FIG. 2, or any other hydraulic load represented in FIG. 1 by load L supplied with fluid under pressure by fixed displacement pump 44 through line 46. Second hydraulic means, such as tap 48 in line 44, establishes a second pressure signal $P_2$ responsive to, and representing, the pressure of the fluid supplying the load L.

The summing pressure compensator control 10 has a summing junction 50 designed to receive limited flow representative of the pressure differential between the pressure signals $P_1$ and $P_2$. Therefore, lines 52 and 54 connect the pressure taps 42 and 48 with the summing junction 50. The lines 52 and 54 furthermore include flow restriction orifices $R_1$ and $R_2$ which in conjunction with the junction 50 establishes an average pressure $P_3$ at the summing junction 50. Because of the extremely small diameters of the restrictive orifices $R_1$ and $R_2$, and other orifices downstream which will be discussed later, the lines 52 and 54 are provided with filters $F_1$ and $F_2$.

The restrictive orifices $R_1$ and $R_2$ have several purposes including preventing any substantial loss of hydraulic fluid from the main loop of transmission 12 or load feedline 46. Thus, the restrictive orifices have a diameter less than 0.050". Furthermore, the restrictive orifices $R_1$ and $R_2$ create a pressure bridge with a summing junction 50. The pressure at the junction 50 is at a value between $P_1$ and $P_2$, since there is a very restrictive flow from one of the lines 52 and 54 to the other, determined by whether pressure $P_1$ or $P_2$ is greater, with a pressure drop across both $R_1$ and $R_2$. If $R_1$ and $R_2$ are of equal diameter, the pressure $P_3$ established at the summing junction 50 will equal one-half the sum of pressure $P_1$ plus $P_2$ since there is equal pressure drop across the two restrictive orifices $R_1$ and $R_2$. If $P_1$ is greater than $P_2$, the pressure will drop across each orifice will equal $\frac{1}{2}(P_1-P_2)$ and, therefore, $P_3=P_1-\frac{1}{2}(P_1-P_2)=\frac{1}{2}(P_1+P_2)$, which is the average of the input pressures. The average pressure $P_3$ can also be a weighted average pressure by varying the ratio of the diameters of orifices $R_1$ and $R_2$. If it is decided to provide a weighted average in favor of pressure $P_1$, orifice $R_2$ is of smaller diameter than orifice $R_1$ providing a greater pressure drop across $R_2$ than $R_1$. Thus the average pressure $P_3$ will be closer to pressure $P_1$ than pressure $P_2$.

Also connected to the summing junction 50 is a third or output line 56 including a restrictive orifice $R_3$ and leading to a normally closed first pressure responsive means or relief valve 58. The pressure relief valve 58 is in a line 60 leading to drain 62 and including a gain orifice $R_G$. The relief valve 58 is biased closed by an adjustable spring 64 and is biased open by a pressure pilot 66 connected upstream of the valve. The relief valve 58 is also biased closed by a downstream connected pilot 68. Therefore, when relief valve 58 is open there is always a pressure drop across the relief valve 58 which is equal to the setting of the adjustable spring 64.

A control line 70 connects line 60 upstream of the gain orifice $R_G$, where a control signal $P_c$ is established, to the displacement control valve 30 as seen in FIGS. 1 and 5. The control signal $P_c$ is thus applied in opposition to the primary input signal of line 24 to bias the valve spool 36 downwardly to cause clockwise movement of the swashplate 34 to increase motor 16 displacement. This control signal $P_c$ only occurs when the first pressure responsive means or relief valve 58 is open, since otherwise the line 70 is only connected to drain 62 through the gain orifice $R_G$. However, when the average pressure $P_3$ reaches a setting above a first predetermined pressure selected by adjustment of spring 64, the control signal $P_c$ will be equal to a percentage of $P_3$ minus the spring setting of spring 64, as determined by the ratio of the restrictive orifice $R_3$ and the gain orifice $R_G$. The orifices except for $R_G$, as one progresses downstream in the control circuit, are always of greater restrictive size and thus $R_3$ is less than either $R_1$ or $R_2$. It is thus envisioned that $R_1$ and $R_2$ could be 0.036", $R_3$ would be 0.013" and $R_6$ would be 0.026". It is also noted that $R_3$ could be downstream of the valve 58 and thus in line 60, but line 70 must join line 60 between orifices $R_3$ and $R_G$ in order to obtain the control gain.

The relief valve 58 is set at a pressure setting equal to the desired average pressure at the summing junction 50 which, when $R_1$ and $R_2$ are equal, would be set at one-half the desired maximum pressure of $P_1$ plus $P_2$. For example, if the relief valve 58 is set to open at 3500 psi, $P_c$ will equal zero until $P_3$ is increased to above 3500 psi. With the diameter of orifice $R_3$ equaling one-half the diameter of orifice $R_G$, there will be an effective gain of 16 to 1. Therefore, for every 400 psi increase in $P_3$ above the relief valve setting of 3500 psi in the present example, there will be 25 psi increase in $P_c$ as shown by line 71 in FIG. 4. This continuing increase in $P_c$ is progressively applied in opposition to the input signal of line 24 at the displacement control valve 30.

Figure 8:
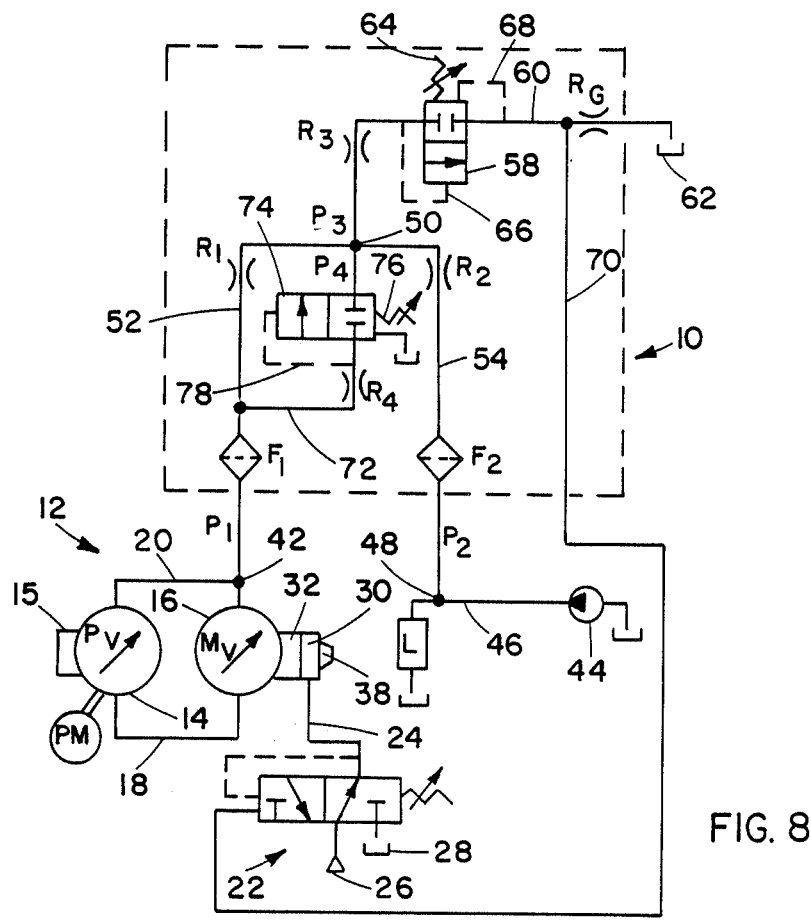
FIG. 8 is a schematic diagram of a modification of the summing pressure compensator of FIG. 1.

It is noted that the control signal $P_c$ is applied to displacement control valve 30 in opposition to the primary input signal of line 24 which drives the motor 16 toward minimum displacement. However, it is well within the skill of the art to also utilize the control signal $P_c$ to reduce the primary input signal of valve 22. For example, line 70 could be applied as a pressure signal to the left side of valve 22 rather than being connected to the displacement control valve 30. In such instance, an increase in pressure signal $P_c$ biases the valve 22 toward the right against its adjustment spring to increasingly communicate line 24 to drain 28. This progressively reduces the primary input signal in line 24 causing a decrease in motor displacement. Such a control system is shown in FIG. 8. Of course, the signal $P_c$ can also be applied to the valve spool 36 to modulate its displacement as established by the pilot valve 38 when an electrohydraulic displacement control is utilized in place of the hydraulic input signal of line 24.

Increasing the displacement of the variable displacement motor 16 limits the pressure in the transmission 12 with the motor 16 operating at lower speed, and thus limits the load on the prime mover PM. If the prime mover also drives the fixed displacement pump 44 of load L, there can be no reduction of the prime mover requirements by load L since its hydraulic requirements are not modified by the summing pressure compensator control. However, limiting the prime mover load required by the transmission 12 will limit the total load requirements on the prime mover PM.

The summing pressure compensator control 10 can also be provided with an overpressure compensator control. As seen in FIG. 1, line 72 also connects line 52 with summing junction 50 but in parallel with that portion of line 52 including restrictive orifice $R_1$. Line 72 includes a restrictive orifice $R_4$ and a second pressure responsive means or sequence valve 74. The sequence valve 74 is bias closed by an adjustable spring 76 and biased open by an upstream pilot 78. The sequence valve is also connected to drain and thus has no downstream pilot so that this valve 74 begins to open when the upstream pressure equals the setting of spring 76 regardless of the downstream pressure. The sequence valve is set at a higher second predetermined pressure, by adjustment of spring 76, which is higher than the first predetermined pressure setting of the relief valve 58. The sequence valve 74 limits the maximum pressure in transmission 12, that is pressure $P_1$, regardless of the average of pressures $P_1$ and $P_2$ previously applied to the relief valve 58. Once the pressure $P_1$ of transmission 12 reaches the setting of sequence valve 74, such valve opens and establishes an overpressure signal $P_4$ which overcomes average pressure signal $P_3$ and is directed by line 56 through orifice $R_3$ to the relief valve 58. Thus, the summing junction not only is an averaging junction for pressures $P_1$ and $P_2$ but also receives the overpressure signal $P_4$ when sequence valve 74 is opened. The pressure of line 56 now equals the higher pressure $P_4$ and will automatically open the relief valve 58 if it was not already previously open by the average pressure $P_3$. At such point the control signal $P_c$ will be determined by the overpressure signal $P_4$ of the sequence valve 74 passing through the relief valve 58 to operate the displacement control valve 30 to move the motor swashplate 34 toward a maximum displacement condition. Therefore, even if the average pressure $P_3$ is not sufficient to open valve 58, the overpressure signal $P_4$ will cause the increase in motor displacement to limit the maximum pressure in transmission 12.

FIG. 2 teaches another embodiment of the summing pressure compensator control system of the present invention. This embodiment is particularly useful in dual transmission propelled vehicle, such as a dual track vehicle, and wherein a second hydrostatic transmission is substituted for the load L of FIG. 1. The two transmissions of FIG. 2 have similar numerals to the transmission 12 with its displacement control of FIG. 1, except that the left transmission has the letter L added to the numerals and the right transmission has the letter R added to the numerals. It is noted that the primary input signal is applied by a line 24 to both displacement control valves 30 L and 30 R. The summing pressure compensator control for FIG. 2 is referred to as 10' and is quite similar to the summing pressure compensator control 10 of FIG. 1 and many of the elements of control 10' are given the same number as identical elements providing the same functions in the control 10. Thus, the FIG. 2 summing pressure compensator control 10' also has input lines 52 and 54 connected to respective loads, in this case a pair of hydrostatic transmissions 12L and 12R at pressure taps 42 and 48 to establish the two input signals $P_1$ and $P_2$ the same as in FIG. 1. The input signals $P_1$ and $P_2$ are again supplied to the summing junction 50 downstream of restrictive orifices $R_1$ and $R_2$ to establish an average pressure $P_3$. However, since the two hydraulic loads are identical hydrostatic transmissions, the orifices $R_1$ and $R_2$ are of identical size so that pressure signal $P_3$ is the mean average of pressures $P_1$ and $P_2$. The pressure signal $P_3$ at the output of the summing junction 50 is again applied to a relief valve 58 through a restrictive orifice $R_3$ which is used in conjunction with a gain orifice $R_G$ in order to obtain a pressure signal $P_c$ in line 70.

The summing pressure compensator control 10' also includes a sequence valve 74 to provide an overpressure signal $P_4$ downstream of an orifice $R_4$ and sequence valve 74. However, the sequence valve 74 is now subjected to the higher of the two pressure signals $P_1$ and $P_2$ by means of a shuttle valve 80 which is connected to line 52 by means of line 72 and to line 54 by line 82. The shuttle valve 80 will therefore select the higher of the two pressures $P_1$ and $P_2$ and apply such higher pressure to the sequence valve 74. As in FIG. 1, the summing pressure compensator control 10' has the relief valve 58 set to open at a first predetermined pressure, such as 3500 psi and has a sequence valve 74 set to open at a second higher predetermined pressure such as 5000 psi. As in FIG. 1, the summing control pressure signal $P_3$ operates the relief valve 58 to provide the control signal $P_c$ until sequence valve 74 is open, at which time the overpressure compensator pressure signal $P_4$ establishes the control signal $P_c$ via both valves 74 and 58 in series. This provides the operation range, seen in the graph of FIG. 3 for dual propel systems. Since pressure signal $P_3$ is the average of pressures $P_1$ and $P_2$ and the relief valve 58 is set to open at 3500 psi, the summing pressure compensator control does not initiate action to generate a control signal $P_c$ until the sum of pressures $P_1$ and $P_2$ is equal to 7000 psi as indicated by line 84 in the graph of FIG. 3. At the same time the sequence valve 74, due to the shuttle valve 80, is subjected to the higher of the two pressures $P_1$ and $P_2$ and will open when such higher pressure exceeds 5000 psi. Therefore, regardless of the average pressure $P_3$, pressure signal $P_1$ is limited to a maximum of 5000 psi as indicated by line 86 in FIG. 3 at which time sequence valve 74 opens to generate the control signal $P_c$ regardless of whether pressure signal $P_2$ was previously above or below 2000 psi, that value necessary to cause a 7000 psi total pressure. In the same manner, pressure signal $P_2$ is also limited to 5000 psi before the overpressure compensator sequence valve 74 operates to again generate a control $P_c$ to limit the system pressure and thus the transmission loading. It is noted in the FIG. 2 embodiment that control line 70 is applied to both displacement control valves 30L and 30R in opposition to the primary input signal of line 24. Thus, once the control signal $P_c$ has been generated by either transmission reaching a 5000 psi loop pressure or by the sum of the loop pressures exceeding 7000 psi, both variable displacement motors 16L and 16R increase in displacement to reduce the output speed of the vehicle and the load on the vehicle prime mover. The control signal $P_c$ generated any time the average pressure $P_3$ increases above 3500 psi assures that the motors will operate at an intermediate pressure level to provide long life. The pressure signal $P_c$ caused by opening of sequence valve 74 at 5000 psi assures that neither motor is subjected to excessively high pressures.

Figure 6:
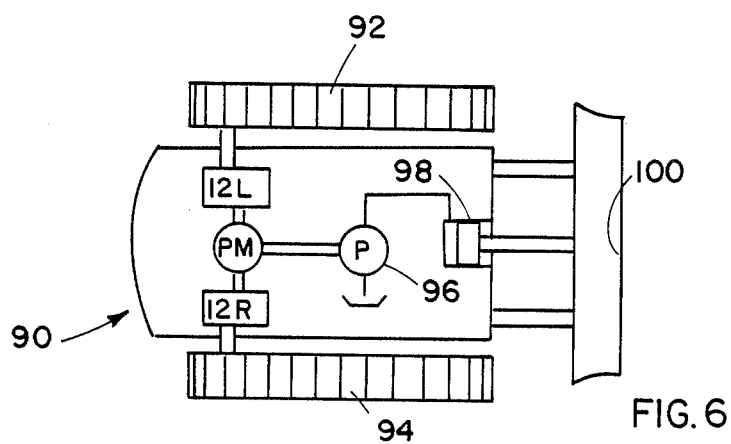
FIG. 6 is a diagrammatic view of a vehicle which may utilize summing pressure compensator system of FIG. 2.

FIG. 6 shows a rough diagrammatic view of a vehicle 90 which has left and right tracks 92 and 94 operated by the hydrostatic transmissions 12L and 12R, both driven by the prime mover PM. The prime mover further is utilized to drive other hydraulic loads on the vehicle which are only schematically shown in FIG. 6 as a pump 96 supplying a hydraulic ram 98 operating a blade 100. The pump 96 operating the ram 98 is emblematical of the various hydraulic implements or accessories utilized on mobile equipment. Similarly, the tracks 92 and 94 are emblematical of well-known hydrostatically driven propel mechanisms and could also be ground engaging wheels.

Figure 4:
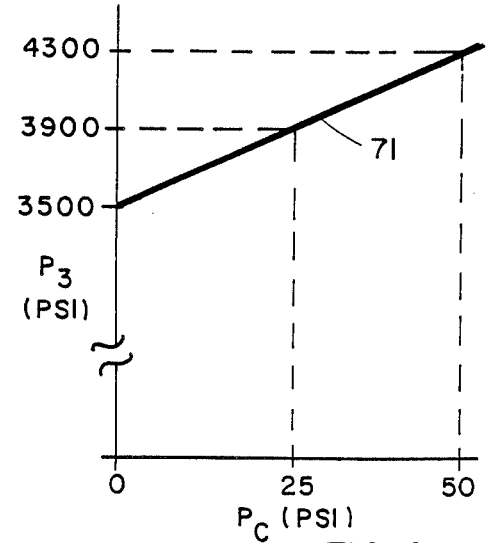
FIG. 4 is a graph teaching the control gain of a hydraulic summing pressure compensator control, such as taught in FIGS. 1 or 2.

These additional hydraulic accessories create an additional load on the vehicle prime mover PM, and if the vehicle is horsepower limited, it may also be desirable to limit the overall horsepower requirements on a priority basis with the speed of the propel system being reduced to assure sufficient hydraulic power to the accessories when maximum engine load conditions are encountered. As can be seen in FIG. 2, this can be easily incorporated into the summing pressure compensator control 10' of the present invention. The various vehicle accessories are represented by IMPLEMENT which provides an implement pressure signal $P_I$. The pressure signal $P_I$ is applied to a second summing junction 102 by means of line 104 and restrictive orifice $R_5$. The second summing junction 102 also receives the average transmission pressure signal $P_3$ through an orifice $R_6$. The second summing junction 102 operates in a similar manner to the first summing junction 50 to provide an average, or preferably a weighted average pressure, with orifices $R_5$ and $R_6$ being different. The pressure at junction 102 is supplied to the relief valve 58 through orifice $R_3$ which is now downstream of the second summing junction 102. Again, orifice $R_3$ can be upstream or downstream of the relief valve 58, but must be upstream of line 70 in order to obtain a hydraulic gain for the pressure signal $P_c$ such as seen in FIG. 4.

Figure 7:
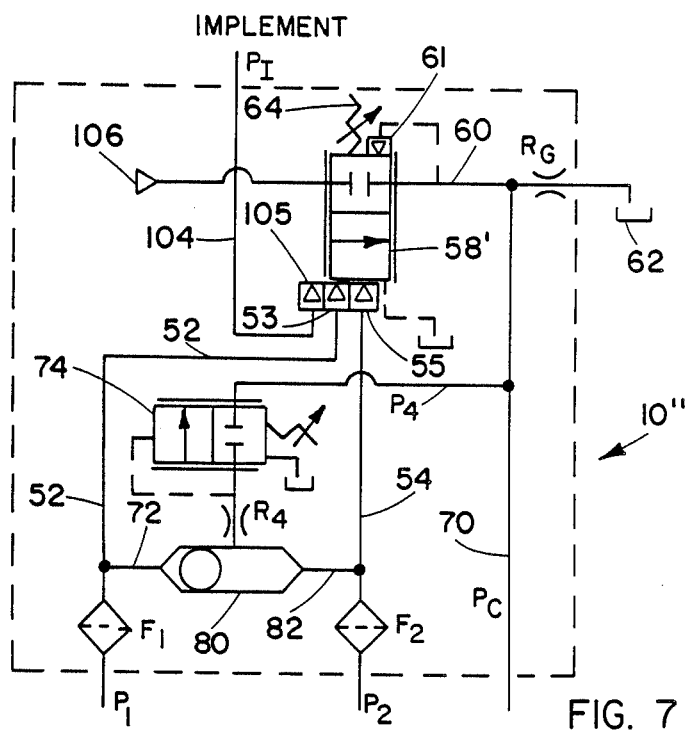
FIG. 7 is a schematic diagram of a further modification of the summing pressure compensation of FIG. 2.

Another form of the summing pressure compensator control which is hydraulic in nature is taught in FIG. 7 with only the control 10'', which can be substituted for either the control 10 of FIG. 1 or the control 10'' of FIG. 2, being shown. Again, where there are similar elements to that used in the previous figures, the same element numerals are utilized. The compensator control 10'' receives pressures $P_1$ and $P_2$ which can be from a pair of transmissions or from a single transmission and another load as previously described. However, in the compensator 10'', there is no summing junction 50 and the pressures $P_1$ and $P_2$ are directly applied to the relief valve 58', which acts as the summing means. The relief valve 58' is again normally biased closed by an adjustable spring 64, but has a plurality of pilots operating in opposition to the spring 64. The pressures $P_1$ and $P_2$, in lines 52 and 54 leading to pilots 53 and 55 respectively, thus tend to bias the valve 58' toward an open position. Where the two pressures are to have an equal effect on the valve 58', the areas of the pilots 53 and 55 are equal. However, it is also possible to have a weighted effect by providing a ratio in the areas of the pilots 53 and 55. Similarly, the implement pressure $P_I$ can be applied to the valve 58' through line 104 which is now connected to pilot 105 which also operates in parallel with the pilots 53 and 55. Normally, pilot 105 is of smaller area than the other two pilots in order to provide the proper weighting of the pressure signals.

The gain of the summing control valve 58' is now established by the pilot pressures times the applicable areas of valve 58', rather than by a series of orifices utilized in conjunction with summing junctions. Acting in an opposite direction to the pilot pressures opening the valve 58' is a pilot pressure 61 connected to control line 60 which operates in parallel with the force of adjustable spring 64. Therefore, the total gain can be determined by the pressure $P_c$, times the area of pilot 61, which is equal to pressure $P_1$ times the area of pilot 53, plus pressure $P_2$ times the area of pilot 55, plus the implement pressure $P_I$ times the area of pilot 105, minus the force of spring 64. It is noted that the flow through the valve 58', when opened by the pilot pressures, can come from any convenient source of supply pressure represented by source 106. This can be charge pressure, or it also could be a connection to one of the lines 52 or 54 through an orifice providing a pressure reduction.

The compensator control 10'' can also be provided with a maximum pressure override valve 74 as in the previous embodiments. However, since there is no longer a summing junction 50, the overpressure signal $P_4$ is directly supplied to the line 70. The pressure $P_4$ will override any pressure produced in line 60 by the summing pressure compensator relief valve 58' to generate a new $P_c$. The gain of the overpressure signal from the sequence valve 74 is determined by the relative sizes of the orifice $R_4$ upstream of the sequence valve 74 and the gain orifice $R_G$.

While the above descriptions are directed to the preferred embodiments which provide totally hydraulic summing pressure compensators, it is also envisioned other forms of the control could be utilized. For instance, the pressure signals $P_1$ and $P_2$ could be applied to pressure transducers converting the hydraulic signals to electrical signals. The electrical signals representing $P_1$ and $P_2$ could then be processed by electrical means, including microprocessors, which would sum the electrical pressure signals to determine the instantaneous average thereof and also could determine the higher of the pressure signals $P_1$ and $P_2$. The average signal and the higher signal would then be compared with set points to establish an electrical control signal $P_c$ which would be the equivalent of the hydraulic signal of the preferred embodiments of FIGS. 1 and 2. The electrical control signal $P_c$ could then be applied to an electrohydraulic transducer such as the pilot valve 38 of the FIGS. 1 and 5 to operate the motor servo mechanism 32 to increase the displacement of the motor (FIG. 1) or motors (FIG. 2).

As can be ascertained from the aforesaid described control systems, the object of providing a summing pressure compensator control, with or without an overpressure compensator control, has been illustrated and described and in connection with the two particular control embodiments illustrated. It will be apparent to those skilled in the art that various changes may be made therein without departing from the spirit of the invention as set forth in the appended claims.

I claim:

1. A summing pressure compensator control for a plurality of hydraulic loads with at least one of said hydraulic loads being a variable displacement motor having servo means for controlling the displacement thereof, first hydraulic means responsive to the supply of fluid to said variable displacement motor to provide a first pressure signal, second hydraulic means responsive to the supply of fluid to a second hydraulic load to provide a second pressure signal, summing means for receiving said first and second pressure signals and providing a control signal proportional to the sum of said first and second pressure signals, said control signal being applied to said servo means to increase the displacement of said variable displacement motor.

2. The summing pressure compensator control of claim 1 wherein a primary input signal is applied to said motor servo means in a manner which decreases the displacement of said motor and said control signal is applied to said servo means opposite said primary input signal so as to increase the displacement of said motor.

3. The summing pressure compensator control of claim 1 wherein a primary input signal is applied to said motor servo means in a manner which decreases the displacement of said motor and said control signal is utilized to decrease the strength of the primary input signal.

4. The summing pressure compensator control of claim 1 wherein electrohydraulic means provide a primary input signal to said servo means for controlling the displacement of said motor and said control signal is applied to said servo means in a manner to override the primary input signal to cause an increase in displacement of said motor.

5. The summing pressure compensator control of claim 1 wherein said summing means includes a hydraulic junction joining first, second and third lines having first, second and third orifices respectively, said first and second pressure signals being applied to said junction through said first and second orifices respectively and a third pressure signal being established in said third line upstream of said third orifice, said third line being in fluid communication with a first pressure responsive means responsive to said third signal to provide said control signal when said third pressure signal is above a first predetermined pressure.

6. The summing pressure compensator control of claim 5 wherein said first and second orifices are of different size whereby the third pressure signal established at said junction is a weighted average of said first and second pressure signals.

7. The summing pressure compensator control of claim 5 wherein said first and second orifices are of the same size whereby said third pressure signal is the mean average of said first and second pressure signals.

8. The summing pressure compensator control of claim 5 wherein said first pressure responsive means is a normally closed relief valve set to open at said predetermined pressure, and a hydraulic line incorporates said relief valve and is connected upstream of said relief valve to said third line and downstream of said relief valve to drain through a gain orifice, and a servo control line connects to said hydraulic line downstream of said third orifice and relief valve and upstream of said gain orifice and is further connected to said servo means to communicate said control signal to said servo means.

9. The pressure compensator control of claim 1 wherein said summing means includes a first pressure responsive means, responsive to a third pressure signal representative of the average of said first and second pressure signals to provide said control signal when said third pressure signal is above a first predetermined pressure.

10. The pressure compensator control of claim 9 having a second pressure responsive means responsive to at least one of said first and second pressure signals to establish an overpressure signal substantially equal to said at least one pressure signal when said at least one pressure signal is above a second predetermined pressure, and means for applying said overpressure signal to said servo means to increase the displacement of said variable displacement motor.

11. The summing pressure compensator control of claim 10 wherein said overpressure signal is applied to said summing means to override the previously established third pressure signal when said first pressure signal is above said second predetermined pressure.

12. The summing pressure compensator control of claim 1 wherein said summing means comprises a normally closed relief valve having at least two pilots for receiving said first and second pressure signals and acting in parallel to bias said relief valve toward an open position.

13. The summing pressure compensator control of claim 12 wherein said pilots are of different areas so as to provide a weighting of the pressure signals acting to open said relief valve.

14. The summing pressure compensator control of claim 12 wherein said relief valve permits a flow of fluid from a source through a gain orifice with said control signal being generated upstream of said gain orifice.

15. The summing pressure compensator control of claim 12 having a second pressure responsive means responsive to at least one of said first and second pressure signals to establish an overpressure signal equal to said one of said pressure signals when said signal is above a second predetermined pressure, and means for applying said overpressure signal to said servo means to increase the displacement of said variable displacement motor.

16. The summing pressure compensator control of claim 12 wherein said first and second pilot signals represent the operating pressures of pair of transmissions for a vehicle and wherein the areas of said pilots receiving said first and second pressure signals are equal and said vehicle further including an implement providing an implement pressure signal which is applied to another relief valve pilot having an area different than the pilots receiving said first and second pressure signals and acting in parallel therewith to bias said relief valve toward an open position.

17. A summing pressure compensator control for a plurality of variable displacement motors comprising first and second variable displacement motors having first and second servo means respectively for controlling the displacement thereof, first hydraulic means responsive to the supply of fluid to said first motor to provide a first pressure signal, second hydraulic means responsive to the supply of fluid to said second motor to provide a second pressure signal, summing means for receiving said first and second pressure signals and providing a third pressure signal which is the average of said first and second pressure signals, a first pressure responsive means responsive to said third pressure signal to provide a control signal when said third pressure signal is above a first predetermined pressure, said control signal being applied to both said first and second servo means to increase the displacement of said variable displacement motors.

18. The summing pressure compensator control of claim 17 having selector means responsive to said first and second pressure signals to select the higher thereof, second pressure responsive means responsive to the higher of said first and second pressure signals as established by said selector means to establish an overpressure signal when the highest of first and second pressure signals is above a second predetermined pressure, and means for applying said overpressure signal to both said first and second servos to increase the displacement of both said variable displacement motors.

19. The summing pressure compensator control of claim 18 wherein said overpressure signal is applied to both said servo means through said first pressure responsive means.

20. The summing pressure compensator control of claim 18 wherein said summing means comprises a junction having first, second and third lines with first, second and third orifices respectively, said first and second pressure signals being applied to said first and second orifices and said third orifice being in fluid communication with said first pressure transducer means, said second pressure responsive means being a normally closed sequence valve subjected to said highest of said first and second pressure signals as established by said selector means, said sequence valve opening when said highest of said first and second pressure signals is above said second predetermined pressure to generate said overpressure signal which is higher than said third pressure signal, said overpressure signal being applied to said junction by a fourth line so as to also be applied to said first pressure responsive means.

21. The summing pressure compensator control of claim 20 wherein said selecting means is a shuttle valve subjected to said first and second pressure signals and operable so as to direct the highest of said first and second pressure signals to said second pressure transducer and wherein said second pressure transducer is controlled by the highest of said first and second pressure signals as selected by said shuttle means.

22. The summing pressure compensator control of claim 17 wherein both said servo means are supplied with primary control signals for controlling the displacement of both said first and second variable displacement motors, said control signal being applied to both said servo means to override said primary control signals to drive the displacement of said motors toward a maximum displacement position.

23. The summing pressure compensator control of claim 22 wherein said servo means includes a hydraulic displacement control valve, said primary control signals are displacement reducing hydraulic signals and said control signal is a displacement increasing hydraulic signal, said primary control signals and said control signal being applied to said displacement control valve in opposing relationship.

24. The summing pressure compensator control of claim 17 wherein said summing means comprises a hydraulic junction having first, second and third lines having first, second and third orifices respectively, said first and second pressure signals being applied to said junction through said first and second orifices respectively and said third pressure signal being established in said third line upstream of said third orifice, said third line being in fluid communication with said first pressure responsive means.

25. The summing pressure compensator control of claim 24 wherein the third orifice provides a greater restriction to flow than either said first or second orifice.

26. The summing pressure compensator control of claim 24 wherein said first and second orifices are of equal restriction valve and said first and second variable displacement motors form a part of first and second transmissions of equal capacity and providing drives for opposite sides of a vehicle.

27. The summing pressure compensator control of claim 24 wherein said first pressure responsive means is a normally closed relief valve set to open at said first predetermined pressure, and further including a hydraulic line incorporating said relief valve and said third orifice and being connected downstream of said relief valve to a drain through a gain orifice, and a servo control line is connected to said hydraulic line downstream of said relief valve and said third orifice and upstream of said gain orifice and being further connected to said servo means.

28. The summing pressure compensator control of claim 27 wherein the ratio of the areas of said third orifice and said gain control orifice determines the hydraulic gain of the compensator control system.

29. The summing pressure compensating control of claim 17 wherein a vehicle is provided with at least one hydraulically driven implement whose load determines an implement pressure signal, said implement pressure signal being directed to a second summing junction upstream of said first pressure responsive means to establish a pressure signal representing the average of said implement pressure signal and said third pressure signal which is applied to said first pressure responsive means.

* * * * *